P. G. & G. RICE.
Hackling Machine.
No. 261.
Patented July 11, 1837.
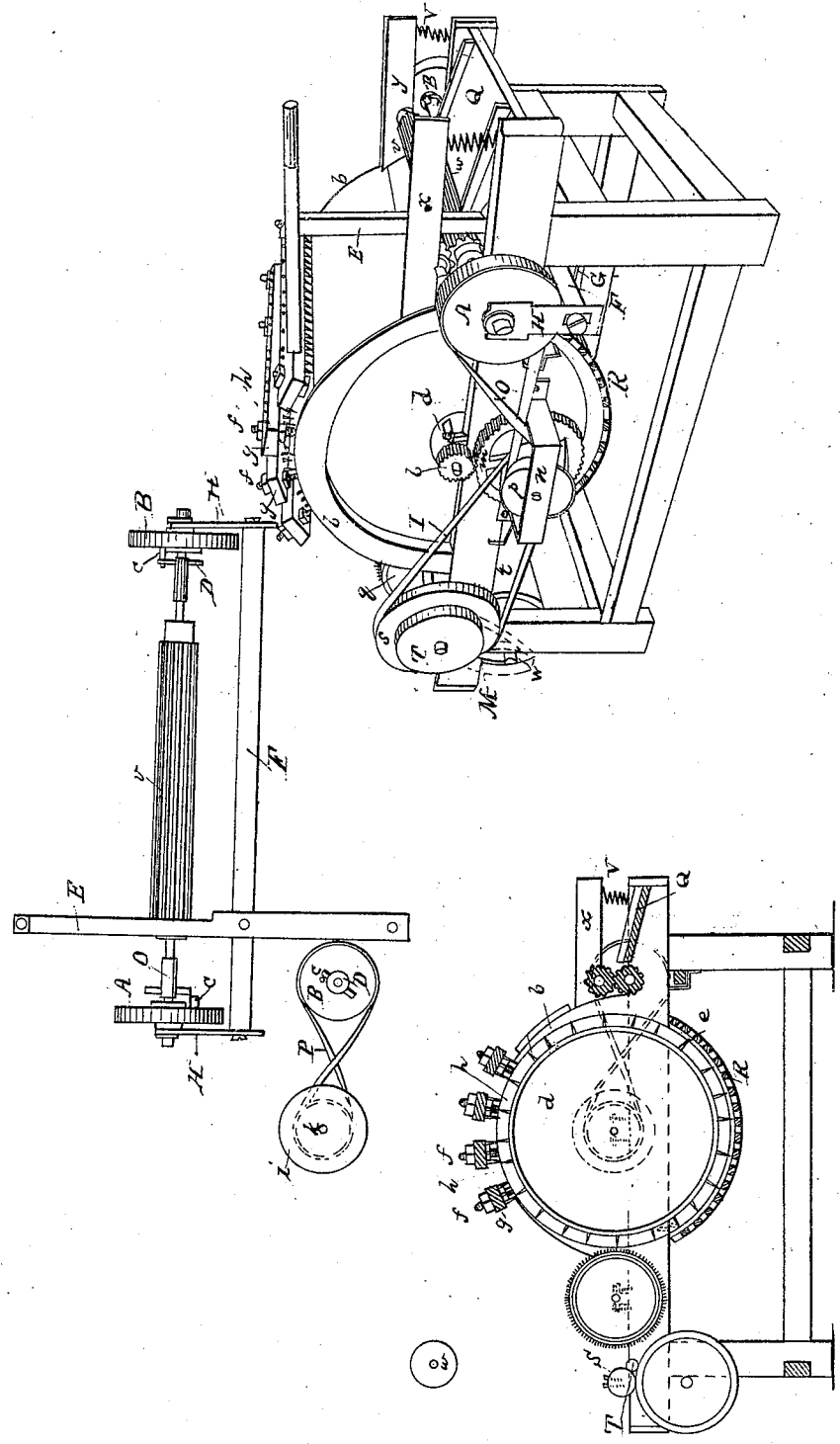

UNITED STATES PATENT OFFICE.

PHINEHAS G. RICE AND GABRIEL RICE, OF DANVILLE, KENTUCKY.

MACHINE FOR HACKLING HEMP AND OTHER LINT.

Specification forming part of Letters Patent No. 261, dated July 11, 1837.

*To all whom it may concern:*

Be it known that we, PHINEHAS G. RICE and GABRIEL RICE, of Danville, in the county of Mercer and State of Kentucky, have invented a new and useful Machine for Hackling Hemp and other Lint, called the "Lansford Revolving Hackle;" and we hereby declare that the following is a full and exact description of the machine and the manner of using it.

We construct a frame-work, $a$, similar to those in which the common wool-carding machine is set up and made to operate, with such variations as are hereinafter mentioned for the more convenient accommodation and operation of our machine. Our frame is eight feet six inches long and three feet eight inches wide from out to out, and three feet high to the square or top of the upper sills. On the upper side sills there are raised two semicircles, $b\ b$, of two-inch plank, (for the purpose of receiving the top stands hereinafter mentioned,) and to each of these there is attached a lining of one-inch plank, with a hollow in each at the center, through which the shaft $c$ of the main cylinder passes. The main cylinder $d$ is thirty-six inches in diameter and thirty-two inches in length, and is constructed by placing twenty-four slats around two cast-iron circles, as in the construction of the large cylinder of the common wool-carding machine. These circles are of plank or timber worked down to the thickness of two inches. In each of the slats are placed three rows of hackle-teeth, $e$, at right angles to the slats, and standing in rows about an inch and a quarter apart. The two outside rows have each twenty-two teeth and the middle row twenty-one teeth, so placed as to describe circles intermediate and parallel to the circles described by the teeth in the outside rows when the cylinder is in motion. The teeth are of cast-steel worked to three-sixteenths of an inch square at the base, and tapered to a point. They show two inches in length above the slat, and their shanks pass through the slats. The ends of the cylinder are closed up with a plank capping, which extends two inches beyond the body of the cylinder all round, so as to form circles even with the (outer) points of the hackle-teeth. On the tops of the semicircles $b$ are placed the top stands, $f$, before alluded to. These stands as thus formed take a small bolt of iron eight inches long and half an inch in diameter, which has been cut into a screw the whole length, and affix a permanent tap or shoulder about the middle of the screw, to support the top slats, presently described, and prepare a movable tap to fasten on the slats. The top slats, $g$, are seven in number, two inches thick and five inches wide, and of sufficient length to reach across the frame from one stand to another and be fastened on. In each of these slats are placed hackle-teeth of the same description, number, and position as those in the cylinder, and pointing in toward them, and by turning the stands the distance of the points of the teeth apart is regulated. That distance should be about a quarter of an inch as the cylinder revolves. The top slats are placed about three inches apart on the semicircles, and the slat nearest the feed-rollers (to be presently described) is about one foot from them. The shaft of the main cylinder is of bar-iron, about an inch and a half in diameter. It works on stands fixed on the top sills of the frame at the holes or openings of the linings of the semicircles, and extends through them. On one end of this shaft are fixed two wooden pulleys, $i\ k$. The inner pulley, $i$, is fifteen inches in diameter, and is that by which the machine is driven, by horse, water, or steam power applied by suitable machinery. The outer pulley, $k$, is eight inches in diameter. On the other end of the shaft is an iron cog-wheel, $l$, four inches in diameter, working into another, $m$, of like material, and twelve inches in diameter. This last wheel is fixed on a shaft seven inches long, one end of which works in an auger-hole (supported by bushing) bored in the lower part of the top sill. The other end is supported by a strong iron bar, $n$, fastened at each end to the sill and bent out in the middle from the frame about five inches, so as to receive the end of the shaft and permit the working of the large cog-wheel and two pulleys, $o\ p$, placed on the shaft out from the wheel. The first of these pulleys, $o$, is three inches in diameter. The other, $p$, is five inches in diameter.

In front of the large cylinder is the doffer $q$, being constructed like the large cylinder, but is only sixteen inches in diameter, and covered with filleting cards made of wire No. 18, instead of hackle-teeth. The shaft of the doffer is four feet four inches long, and carries the wooden pulleys $r\ s$ on the end next the cog-wheels aforesaid. The shaft works in stands placed on the frame, and at such a distance from the main cylinder as to bring the cards within one-quarter of an inch of the hackle-teeth. The inside pulley, $s$, on the doffer-shaft is twenty-one inches in diameter, and the outside pulley, $r$, is twelve inches in diameter. In front of the doffer is the drum $t$, eighteen inches in diameter, constructed as the doffer, except that it is naked, having neither hackle-teeth nor cards. It is parallel to the doffer, and about two and a half inches from it, but lies lower on the frame, the top of the drum rising only about an inch higher than the bottom of the doffer. The shaft of the drum carries a pulley, $u$, seven inches in diameter, and ranging with the outer pulley on the shaft of the doffer. The shaft of the drum works in stands fixed to the uprights of the frame.

In the rear of the large cylinder, and contiguous thereto, are the feeders, consisting of two fluted rollers, $v\ w$, lying one above the other. They are geared in each other, and the top one, $v$, is turned by the bottom one, $w$. Above the rollers a board, $z$, is fixed to the semicircle, extending from the nearest top slat to about the center of the top feed-roller. The top roller is kept in place by levers $x\ y$ extending from each semicircle, and fastened by hinges. The lower sides of these levers have inverted beds cut in them for the shaft of the top roller to work in, and that roller is kept in place and made to do its office by the pressure of the levers. The shaft of the lower feed-roller is four feet and a half long, lies in beds let into the frame, and extends over the sides of the frame, so as to carry a slack pulley, A B, on each end, ten inches in diameter. These pulleys have each a bushing of iron extending outwardly somewhat like the hub of a wagon-wheel. On the inner side of each pulley is fixed a screw-bolt, C, and near to where the bolt plays is fixed a cross, D, through the shaft. These crosses are so placed that by the working of an upright lever, E, (hereinafter described,) the crosses may each alternately be brought in contact with its proximate screw-bolt, and thereby change the pulleys from slack pulleys to fixed pulleys. Under the bottom feed-roller and its pulleys, and parallel thereto, lies a piece of scantling, F, four feet four inches in length and three inches in diameter. It is held up by stands G, fixed to the under side of the top sills of the frame in such a manner as to be moved by the upright lever. From each end of this piece of scantling there rises an iron upright, H, with a fork in the top to receive the projecting part or hub of the bushing of the pulley on the feed-roller. It should have been noted that each hub has a groove cut round it to make it fit and revolve in the post more securely and to keep it from flying out. The upright lever extends from near the bottom of the frame to some distance above the top. It is connected with the piece of movable scantling, and forms a cross with it.

The machine is put in operation as follows: When the necessary force is applied to the large pulley $i$ on the shaft of the large cylinder, it is communicated from the small to the large cog-wheel. From the small pulley $o$ on the cog-wheel shaft a leather band, I, passes to large pulley $s$ on the doffer $q$, and from the small pulleys on the doffer a band, M, passes to the pulley on the drum. From the outer or large pulley, $p$, on the large cog-wheel shaft a band, O, passes to its correspondent pulley on the axle of the bottom feed-roller; and from the small pulley $k$, on the end of the shaft of the large cylinder, a band, P, passes to its correspondent pulley on the axle of the lower feed-roller. The band which drives the doffer is an open band. The others are crossed bands. Behind the feed-rollers is placed the feed-board or feed-table Q. Underneath the large cylinder is placed a cradle, R, made of slats fastened on circular pieces of wood, which extend around the bottom of the cylinder about one-third of a circle. The slats are placed about half an inch apart, and are each about three-quarters of an inch wide. The cradle is suspended from the frame and hangs about half an inch from the teeth as the cylinder revolves.

When the machine is put in motion, it is fed in the following manner: The feeder presents one end of a hand of hemp or other lint to the feed-rollers. They receive the hemp and draw it in to be hackled. When the hemp is drawn in to one-half its length, the person in attendance, by the application of a slight force to the upright lever, throws the pulley which has been driving the feed-rollers out of gear— that is, makes it a slack pulley—and it plays freely on the axle; and the same application of force makes the opposite pulley a tight pulley, reverses the motion of the feed-rollers, and they disgorge the hemp in a hackled state. The other end of the hemp is then presented, and hackled as the first. In the meantime the tow passes on from the hackle to the doffer, and from the doffer to the drum, from which it is taken by hand.

To assist the passage of the tow to the drum there are two wooden rollers, S T, about three inches in diameter, which lie on the drum and are moved by it. The tow passes between these rollers and the drum.

We would observe that the hackle here described is adapted to prepare hemp for the manufacture of cotton bagging and other coarse fabrics. If a finer article is required, a correspondent change in the size of the hackle-teeth will be expedient. By the operation here described the tow is prepared for spinning bale-rope, and filling for bagging, &c., by hand. If it is desired to make cordage of the whole material without separating the fine from the coarse, it may all be suffered to pass through the hackle with the tow, and in that way it will all be in a proper state for spinning. The office of the cradle is to keep the hemp or tow from flying off the cylinder as it revolves, and the open spaces between the slats permit the dust, &c., to pass off. If the levers which keep the top feed-roller in place are too light, weights may be suspended to increase the pressure; or the pressure may be very nicely regulated by a spiral spring, U, connecting the levers with the ribs of the frame.

What we claim as our invention, and desire to secure by Letters Patent, is—

The reversing motion given to the feeding-rollers, for the purpose set forth, in combination with a machine for hackling hemp, flax, &c., the parts of which are constructed, arranged, and combined substantially in the manner described in the foregoing specification.

P. G. RICE.
G. RICE.

Witnesses:
  JOHN GREEN,
  T. B. NICHOLS.